Aug. 5, 1958 R. B. DE LANO, JR., ET AL 2,846,615

ELECTROSTATIC MEMORY SYSTEM

Filed May 26, 1953 5 Sheets-Sheet 1

INVENTORS
DONALD R. YOUNG
RALPH B. DELANO, JR.

BY William J. Schelberg
AGENT

Aug. 5, 1958 R. B. DE LANO, JR., ET AL 2,846,615

ELECTROSTATIC MEMORY SYSTEM

Filed May 26, 1953 5 Sheets-Sheet 2

INVENTORS
DONALD R. YOUNG
RALPH B. DELANO, JR.
BY
William V. Schelberg
AGENT

INVENTORS
DONALD R. YOUNG
RALPH B. DELANO, JR
BY William V. Schellenberg
AGENT

INVENTORS
DONALD R. YOUNG
RALPH B. DELANO, JR.
BY
William V. Schellberg
AGENT 2,846,615

ELECTROSTATIC MEMORY SYSTEM

Ralph B. De Lano, Jr., and Donald R. Young, Poughkeepsie, N. Y., assignors to International Business Machines Corporation, New York, N. Y., a corporation of New York Application May 26, 1953, Serial No. 357,608

19 Claims. (Cl. 315—12)

This invention relates to an electrostatic memory system wherein binary information is stored in the form of charges established on the dielectric target surface of a barrier grid storage tube. In particular, this invention is directed to a novel method of operation of barrier grid storage tubes and to an improved system whereby this method may be employed.

The principle of electrostatic storage involves setting up one of two reliably distinguishable charge states at discrete regions on the insulating target surface of a cathode ray type storage tube under the influence of a cathode beam directed thereon and, at a later time, in determining which of the two charge states was established in each region.

In establishing the distinctive charge states, secondary electrons are emitted from an elemental target region during bombardment by the cathode beam and are attracted to a collector electrode element placed near the target end of the tube. As the number of secondary electrons emitted from the region may be greater, equal or less than the number of primary electrons received from the beam, the potential of the region and the collector electrode tend to become equalized and, due to this equalizing action, the tube is capable of functioning as a storage device as will be more fully explained.

Several distinct tendencies to destroy the charges established in adjacent elemental areas have been found to exist. Among these is a tendency for some of the secondary electrons emitted from one region to fall on neighboring positively charged areas and neutralize the charges that have been set up at these spots. A further inclination to destroy information in adjacent regions has been determined to be caused by fringe area electrons in the primary cathode beam itself.

Because of these and other factors causing losses, the charges are not permanent and must be systematically regenerated, however, a reduction in the above mentioned detrimental effects lessens the regeneration requirements and the storage capacity of such memory tubes may, therefore, be increased.

Accordingly, it is an object of this invention to provide a novel method of memory tube operation whereby tendencies to destroy information are substantially reduced.

It is a further object of this invention to provide a system and method of operation for barrier grid storage tubes resulting in output signals of increased magnitude and an increase in the storage capacity of such tubes.

Still another object of the invention resides in providing an improved system and circuit for operating barrier grid storage tubes.

Other objects will be pointed out in the following description and claims and illustrated in the accompanying drawings which disclose by way of example the principle of the invention and a contemplated mode of applying the principle.

In the drawings:

Fig. 1 graphically illustrates the timing and control pulses employed and the wave forms of pulses applied to the control grid and backing plate of a barrier grid storage tube operated under the improved method.

Figure 2:
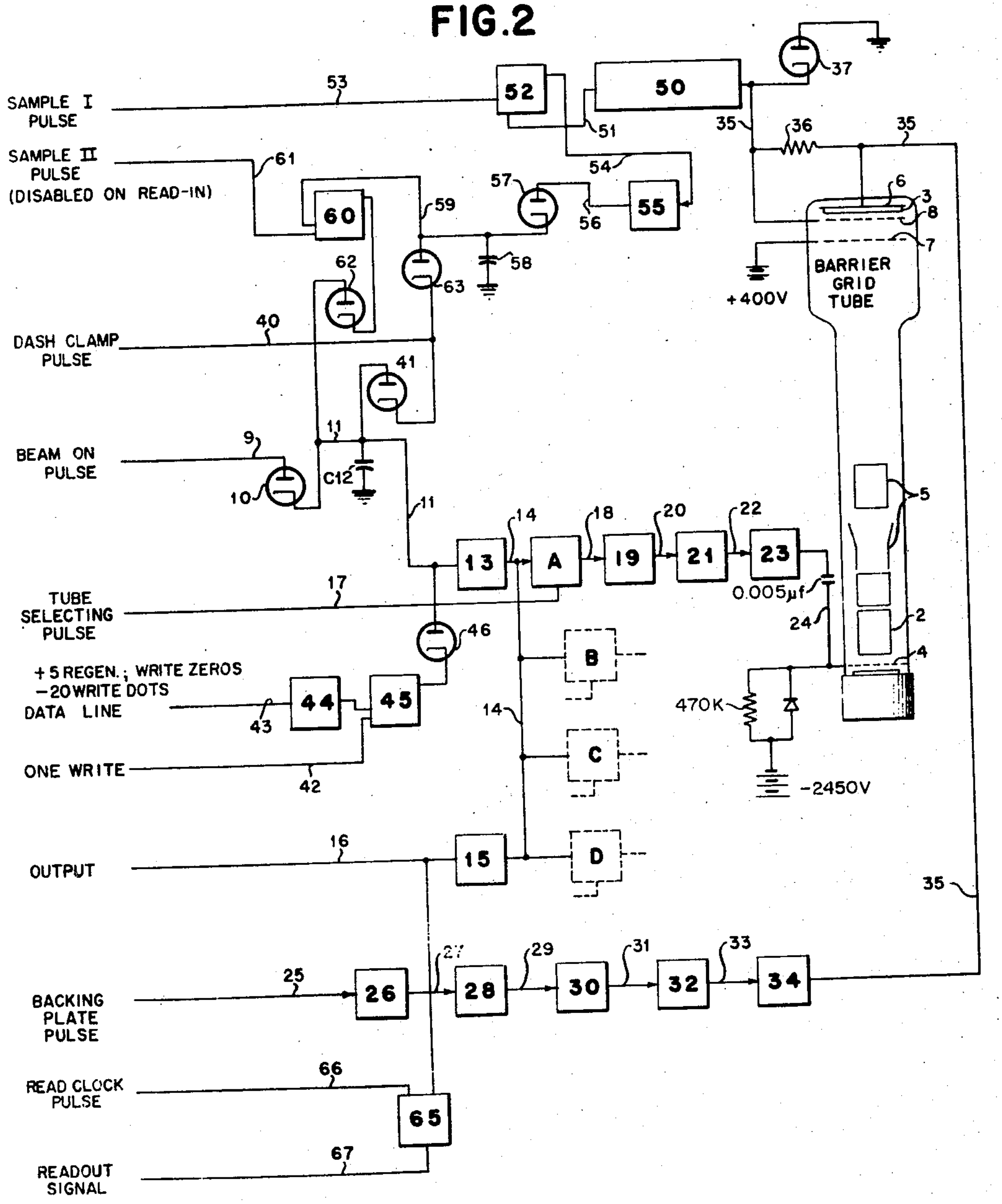
Fig. 2 is a block diagram of the system for electrostatic storage employing the improved method of operation.

Referring to Fig. 2 of the drawing, a storage delay tube of the barrier grid type is illustrated having an envelope 1 within which is positioned an electron gun 2 for forming and focusing an electron beam on a target 3. The beam is turned on under the control of a schematically illustrated grid 4 and is directed to particular elemental areas on the target 3 by pairs of deflection plates 5. As is well known in the art, these pairs of deflection plates 5 are physically arranged to produce electrostatic fields at right angles to one another and to the beam. It is to be understood that these plates will have varying voltages applied to them from a saw-tooth generator, for example, in order to produce line and frame scansion as in television raster or staircase type scanning system, however, appropriate voltages may be applied to the plates for producing spiral scansion or only single line scansion as may be desired. The means for producing different types of scansion of the target surface 3 are well known in the art and, as they are not required for an understanding of the invention, need not be further described here.

The target surface 3 may be considered as divided into small elemental regions each of which is capacitatively coupled with a backing plate 6, and these comprise elemental condensers in which binary information is stored independently of one another by the presence or absence of a charge. The backing plate 6 is placed in contact with the target 3 on the side opposite to that upon which the beam impinges and may be formed, for example, by evaporation of aluminum on the dielectric surface. As the primary electron beam bombards an elemental area of the target, secondary electrons are emitted as before mentioned and are attracted to a collector electrode 7 which is held at a positive potential of approximately 400 volts and positioned between the gun 2 and target 3.

During bombardment of an elemental spot, some secondary electrons collect in the form of a space charge and rain back on the target area rather than flowing to the collector 7 and, since some of the neighboring spots will be positive with respect to the bombarded spot, there is a tendency to remove the positive charge and destroy the stored information. A barrier grid 8 is placed directly on or near the dielectric surface 3 to shield each storage spot from the others and to reduce this detrimental effect of secondary electron redistribution. A futher reduction in the redistribution effect is obtained by placing the collector grid 7 close to the barrier grid 8 and thus presents a high accelerating field for the secondary emission electrons which directs them away from the target.

Figure 6:
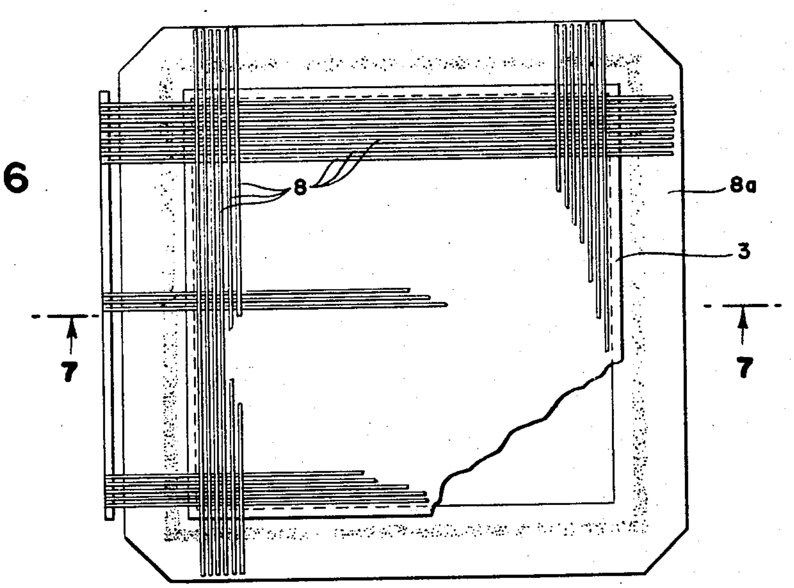
Fig. 6 is a plan view of a barrier grid subassembly comprising a ceramic frame, mica target and barrier grid wires.
Figure 7:
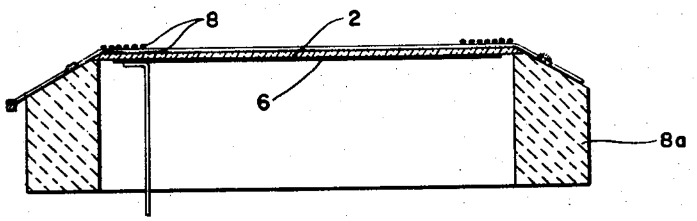
Fig. 7 is a sectional view taken on the line 7—7 of Fig. 6.
Figure 8:
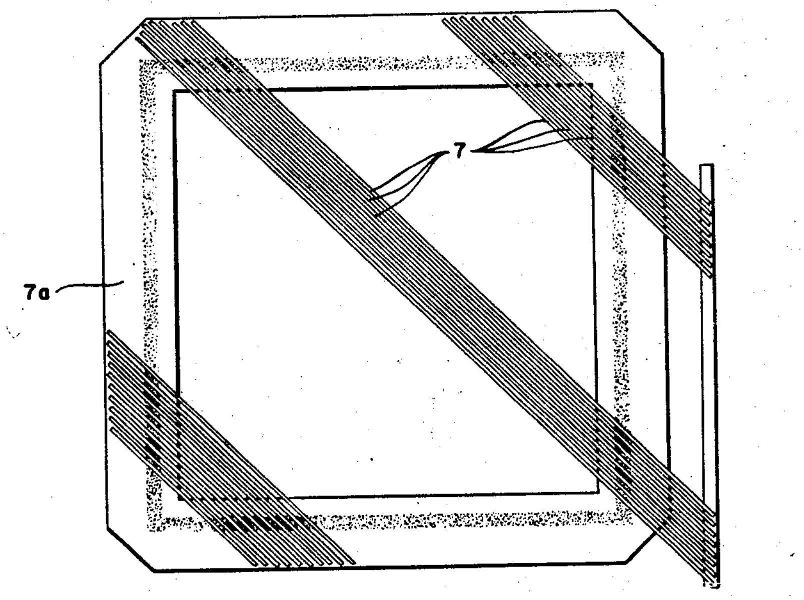
Fig. 8 illustrates the structure of a collector grid subassembly comprising a ceramic frame and grid wires.

The structure of the collector and barrier grid elements is shown in detail in Figs. 6, 7 and 8. The collector 7 as shown in Fig. 8 comprises a plurality of parallel coplanar tungsten wire positioned on a rectangular ceramic frame 7a with the wires arranged at an angle of 45° to the sides of the frame. The barrier grid 8 is fabricated on another ceramic frame 8a and is formed of a grid of tungsten wires arranged at right angles to one another and to the sides of the frame. The method of fabricating the barrier and collector grids and the arrangement for mounting these elements and the target assembly is more fully described in a copending application for U. S. Letters Patent, Serial Number 337,544, filed February 18, 1953, now Patent No. 2,795,840.

The spacing between the barrier and collector grids is made as small as possible with the actual separation governed by the relative voltages applied to these elements. The collector electrode comprises a plurality of parallel coplanar strands arranged at 45° angle to the sides of the frame as described. The purpose of this arrangement is to provide a greater accelerating field for secondary emission electrons adjacent the spaces between the perpendicular wires of the barrier grid electrode.

The target as well as the barrier and collector electrodes are rectangular in shape as this configuration provides a minimum of unusable target surface and consequently reduces the barrier grid to backing plate capacity.

As a result of positioning the collector adjacent the barrier grid at the target end of the tube and providing a reduction in redistribution, the grid wires of both of these electrodes may be more widely spaced and fabricated of strands having a smaller diameter than those heretofore employed. As a consequence, of this structural modification, the interception of electrons by the grid wires is substantially reduced, the barrier grid to backing plate capacity is further reduced and the backing plate may thus swing a larger fraction of the target surface to which it is capacitatively coupled. In actual practice, the grid wires are formed of tungsten strands 0.0007 inch in diameter, spaced at 150 turns per inch for both planes of parallel strands on the barrier grid and spaced at 100 turns per inch for the single layer of 45° strands on the collector grid. The collector and barrier grid units are spaced apart a distance of approximately 0.010 inch with the barrier grid placed in direct contact with the dielectric target surface.

In the method of writing employed, the potential applied to the backing plate 6 before and during the time the beam is turned off determines the potential of the selected spot being bombarded. For example, if the backing plate is pulsed negatively while the beam is on and the beam is turned off before the backing plate modulating pulse is terminated, the spot becomes positive with respect to the collector electrode due to the backing plate to target surface capacity coupling. If the backing plate modulating pulse is terminated before, or no modulating pulse is applied at the time the beam is turned off, the spot remains at the potential of the collector electrode. Two charge states are then available depending on modulation of the potential applied to the backing plate.

In establishing the two charge states in the above described manner, one tendency to destroy information in adjacent spots when writing has been determined to be due to fringe electrons in the beam itself as previously mentioned. The nature of this type of information spilling is that in storing or writing a "1," a neighboring "0" can be changed into a "1" but a neighboring "1" is not disturbed. Likewise, in writing a "0" a neighboring "1" may be changed to a "0" but a neighboring "0" remains unaffected.

As aforementioned, the potential applied to the backing plate 6 at the time the beam is turned off determines whether a "one" or a "zero" is written. In the resetting method of operation, as illustrated by the grid and backing plate modulation waveforms shown in Fig. 1, this tendency to destroy the charge on adjacent regions is substantially reduced. In writing a "one," the beam is turned on and the backing plate pulse thereafter applied until after the beam is turned off with the time interval during which the backing plate is pulsed being equal to that in which it is not pulsed while the beam is turned on. In writing a "zero," the beam is turned on and the backing plate pulsed negatively for a period of time with the negative potential removed from the backing plate before the beam is turned off. It is thus seen that in writing a "zero," part of the total interval is employed in writing a "one." The principle of resetting constitutes operating in a mode such that part of the time, there is a tendency to change a neighboring spot to a "zero" and part of the time a tendency to change it to a "one" with ideally no net effect on the neighboring spots.

Figure 1:
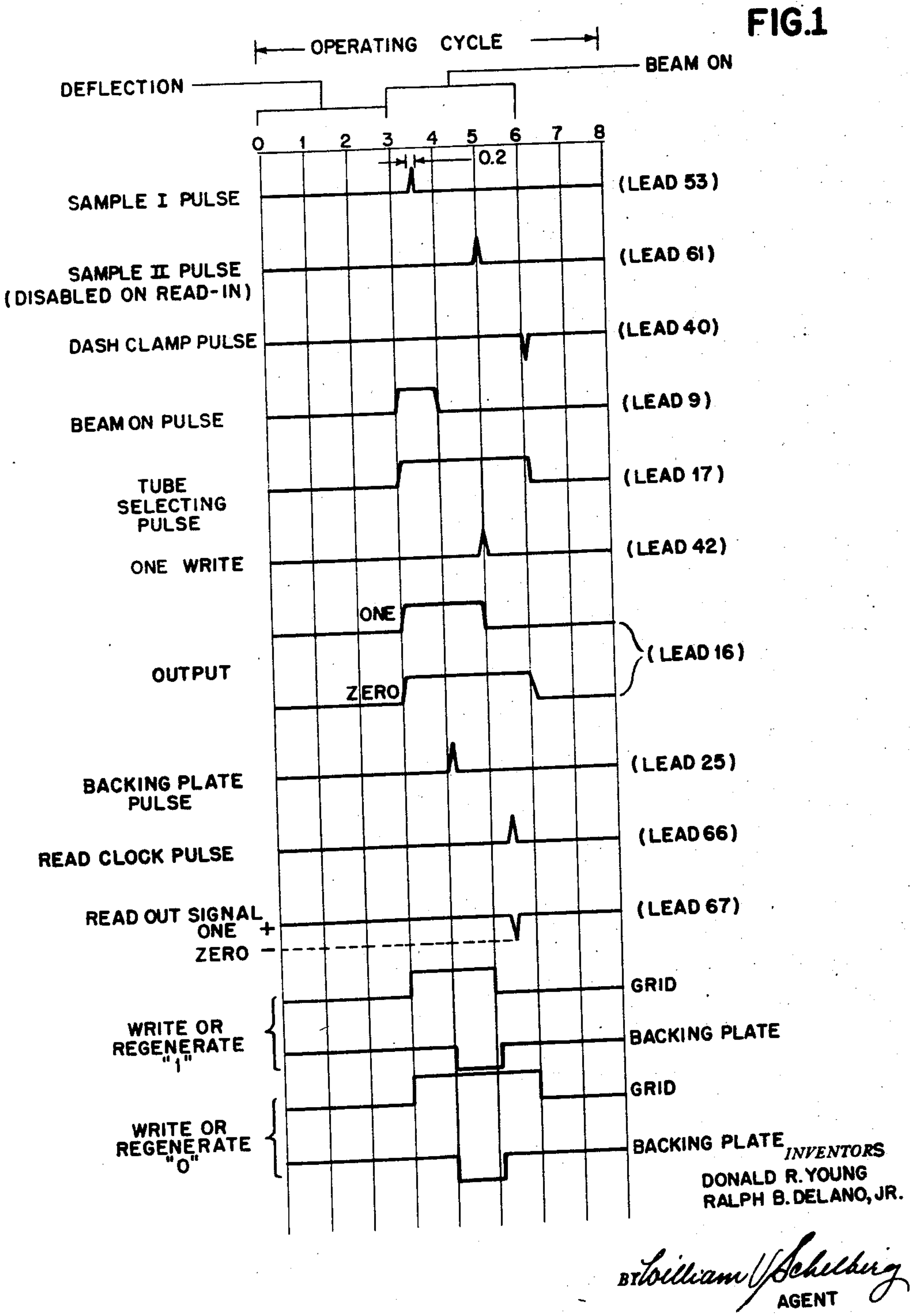

Considering the write operation more in detail, it will be seen in Fig. 1 that two time intervals are employed in writing a "one" and three time intervals employed in writing a "zero." During the first interval in writing a "one," the beam is turned on and functions to erase any information previously stored on the bombarded spot as well as interrogating the spot during regeneration as will be more fully described hereafter. The second interval of beam on time is employed in writing a one and the beam is turned off slightly before the end of the backing plate pulse to prevent partial erasure. The first interval of time is made substantially equal to the second since it is a property of the tube that the time spent in erasing a "one" is proportional the time spent in writing a "one." The first two intervals in the process of writing a "zero" are identical with those employed in writing a "one," however, the third interval is an erase time. Both the first and third intervals are made sufficiently long to completely remove the potential on the target surface which represents a one and since such a charge has been placed on the spot during the second interval, it is erased during the third interval so that a "zero" instead of a "one" is stored.

The purpose of the resetting method of operation is to balance the tendency of fringe electrons in the cathode beam to change neighboring spots into "ones" as a "one" is written by presenting an opposite tendency to also change neightboring spots to "zeros" as a "one" is written. The "zero" writing cycle cannot be completely balanced by these opposing tendencies because of the requirement that there be two erasing intervals and the fact that the write and erase intervals should be about equal to give adequate erasure. It has been found, however, that inclusion of a backing plate pulse in the cycle for writing a zero, increases the storage capacity of the tube considerably.

While the grid, as illustrated in Figure 1, is turned on continuously during the first and second time intervals while writing or regenerating a "one" and during the first, second and third time intervals while writing or regenerating a "zero," it is contemplated that the beam may be turned on or off separately for each of these intervals in each cycle of a write operation.

The method of reading out a stored charge from the backing plate 6 imposes an amplifier recovery problem since this electrode is pulsed with a potential of relatively high magnitude during the immediately preceding writing operation while the output signal to be amplified is comparatively small. The backing plate modulating pulse charges the coupling and inherent interelectrode capacities of the amplifier tubes and must either be dissipated before the small output signal can be amplified or some means provided for lessening the effect of the backing plate pulse on the amplifier. In the arrangement employed, novel amplifier stages having a high recovery rate are used and in addition diodes may be provided, as will be later described, to limit the magnitude of the backing plate pulse impressed on the amplifier input circuit. Further, since the backing plate pulse and reading operation occur at regular intervals, the amplifier need not be completely recovered from the backing plate pulse before the tube is interrogated as the amplitude of the read out signal will not be dependent upon a variable time interval. With this novel arrangement, a read-out operation may follow a write operation more closely than heretofore possible.

Inasmuch as the target is a nonconductor, the potentials at the different regions or spots will remain essentially unchanged for some time despite spill from adjacent spots, however, where the unit of information is to be retained for a long period, it must be regenerated periodically. Regeneration of the information stored on the tube target is done in a systematic fashion and consists in examining each spot to determine which charge state has been stored and thereafter restoring the original charge as will be more fully described hereafter.

The resetting operating cycle illustrated graphically in Fig. 1 requires eight microseconds, of which the first three microseconds constitute a deflection time interval during which the beam becomes stabilized at one position. The beam-on time requires a second period of three microseconds with the first microsecond of this period employed in obtaining information from the tube, in providing a time for resetting when a "one" or positive charge is written and in erasing a previously stored positive charge. The latter function is provided to prevent the charge from increasing or repeatedly writing a "one" in the same region. The second microsecond of this period of beam-on time is coincident with the backing plate pulse and writes a "one" or positive charge on the dielectric target area as well as providing a time for switching during regeneration. The third microsecond of beam-on time is employed only when a zero is written as will be apparent from observation of the waveforms at the lower portion of Fig. 1. Six microseconds are made available for the amplifier to recover from the backing plate pulse between the time of termination of the pulse at the end of the fifth microsecond and the time of reading out the information begining with the fourth microsecond of the succeeding operating cycle.

Referring to the block diagram of the system as shown in Fig. 2, Sample Pulse I, Sample Pulse II, Dash Clamp Pulse, Beam On Pulse and the Backing Plate Pulse are clock pulses delivered from ring circuits or the like and appear at terminals shown at the left of the figure at the times during each cycle of operation as graphically illustrated in Fig. 1.

The positive Beam On Pulse appears on terminal 9 during the fourth microsecond of the operating cycle and is applied through a diode 10, poled to pass this positive pulse, via conductor 11 to a capacitor C12 and to the input of a cathode follower circuit 13. Application of the Beam On Pulse charges the capacitor C12 positively and the latter maintains the conductor 11 at a positive potential for a period of time after the Beam On Pulse is terminated.

The positive potential maintained on conductor 11 is applied through the cathode follower circuit 13 to a conductor 14 which is connected to a plurality of diode coincidence circuits A, B, C and D and to a cathode follower circuit 15 coupled with an output circuit 16.

Two or more storage tubes may be operated in parallel with each provided with individual grid driving circuits.

Assuming the barrier grid storage tube coupled through coincidence circuit A, as shown, is to be employed for storage in the description to follow, the coincidence or "and" circuit A is pulsed with a positive selecting pulse applied on lead 17 during the fourth through sixth microsecond time interval of the cycle. The output of gate A is positive on coincident application of positive inputs over conductor 14 and 17 and a positive output pulse is applied over lead 18 to a pair of inverters 19 and 21 which are connected in series by a lead 20 and through a lead 22 to a clipper 23. These latter circuit components shape the waveform of the pulse before it is applied over a conductor 24 to the turn on grid 4 of the memory tube.

The grid 4 is normally biased to complete cut off by connection to a −2450 volt source through a paralleled 470K resistor and diode, in order to avoid producing a faint trace on the target of the tube during the interval required for potentials applied to the deflection plates 5 to become stabilized. The positive potential initiated by the Beam On Pulse as described, is applied to the conductor 24 and overcomes the normal grid cut off bias whereby the beam is turned on so as to impinge an elemental storage region. The particular elemental region bombarded is determined by the potentials applied to the deflection plate 5 during the first three microseconds of the cycle and which have reached full amplitude at this time.

The Backing Plate Pulse appears on terminal 25 at the beginning of the fifth microsecond of the cycle and is applied to a pull over tube circuit 26, the output of which is applied over conductor 27 and functions to initiate operation of a blocking oscillator 28. The oscillator 28 produces a positive output pulse slightly more than one microsecond in width as determined by the constants of the oscillator circuit elements and the output pulse is applied over a conductor 29 to a cathode follower clipper circuit 30, a cathode follower drive circuit 32 and an inverter circuit 34 connected in series as shown by leads 31 and 33 respectively. The positive backing plate pulse is shaped and clipped by circuits 30 and 32 and is inverted by circuit 34 so as to appear on a conductor 35 as a negative pulse of approximately −130 volts. Conductor 35 is connected to the backing plate 6 of the memory tube and to a resistor 36 which is coupled between the backing plate 6 and the barrier grid 8. The resistor 36 serves to apply most of the negative 130 volt backing plate pulse between the barrier grid and backing plate with the remaining voltage drop of approximately ten volts, applied across a diode bank 37 which may be provided.

The output pulse from the blocking oscillator 28 being slightly greater than one microsecond in duration, as before mentioned, therefore, biases the backing plate 6 negatively from 4.0 microseconds time to 5.12 microseconds time (see Fig. 1), but the beam is not turned off in writing or regenerating a zero until 6.0 microseconds time as will now be described.

At 6.0 microsecond time, the negative Dash Clamp Pulse appears on terminal 40 and is applied to a diode 41. As the cathode of diode 41 becomes negative the condenser C12 discharges terminating the positive pulse applied to the cathode follower 13. Output line 14 which has been held positive until this time by the charge on condenser C12 through circuit 13 now becomes negative. The output of gate circuit A also becomes negative, and the normal bias to the grid 4 of the memory tube is effective to cut off the cathode beam. Simultaneously with this action, the return to a negative voltage on line 14 is applied to cathode follower 15 and terminates the output pulse on terminal 16.

If the output pulse is not terminated before this time by other means which will be described later, a "zero" is stored. The "zero" output pulse then is initially produced by the Beam On Pulse which appears at 3.0 microseconds time and which was applied through the diode 10, cathode follower 13, line 14, and the cathode follower 15 and is maintained by the positive charge on condenser C12 until the latter is discharged by the Dash Clamp Pulse at 6.0 microseconds time. It is to be noted that the cathode beam is cut off by the same means which terminates the output pulse and in writing or storing a "zero" in the memory tube, the beam is turned off at 6.0 microseconds time while the backing plate modulating pulse has been terminated at 5.12 microseconds time corresponding with the grid and backing plate waveforms illustrated in Fig. 1.

In writing a "one" the Backing Plate Pulse is applied in the same manner and for the same time interval as in writing a zero, however, a positive one write pulse is applied at 5.0 microseconds time to discharge the condenser C12 earlier in the cycle and thus cut off the cathode beam and simultaneously terminate the output pulse at the time shown in Fig. 1 as will now be described. The One Write pulse is selectively applied to terminal 42 and the Data Line voltage applied at terminal 43 is maintained at −20 volts. The negative 20 volt Data Line potential is applied to an inverter 44 and a positive output therefrom applied to one of the input terminals of "and-inverter" circuit 45. Conductor 42, upon which the positive One Write pulse appears, is coupled to the other input terminal of circuit 45 and, as coincident positive inputs appear at 5.0 microseconds time, a negative output pulse is obtained therefrom at this instant and is applied to the cathode of a diode 46. The anode of diode 46 is connected with lead 11 to which the positively charged plate of condenser C12 is also coupled as heretofore described. When the output of circuit 45 becomes negative, the cathode of the diode 46 is rendered negative and condenser C12 is discharged cutting off the cathode beam and terminating the output signal at 5.0 microseconds time in the manner previously set forth when the condenser C12 was discharged through the diode 41 by the Dash Clamp Pulse.

The output pulse and cathode beam are then terminated at 5.0 microseconds time which is before the backing plate pulse is terminated at 5.12 microseconds time as illustrated in Fig. 1 and a positive charge representing a binary "one" is stored in an elemental region on the target surface of the memory tube.

In the writing operation, regardless of whether a "one" or a "zero" is written, the backing plate pulse is applied to the tube in an identical manner. In writing a "zero" the Dash Clamp Pulse discharges the condenser C12 and turns the beam off at 6.0 microseconds time or after the backing plate pulse is terminated, while in writing a "one" the One Write pulse discharges the condenser C12 at 5.0 microseconds time or before the backing plate pulse is terminated.

As previously mentioned, storage of binary digits as charges on the dielectric target surface is not permanent and the charges must be regenerated or reestablished periodically. In performing this function, the charge state existing at an elemental area must be determined and restored with the cathode beam controlled in the resetting method of operation.

If a "zero" is stored on the particular target region selected by the potentials applied to the deflection plates 5, then there will be no charge present. The beam is turned on beginning at 3.0 microseconds time and the region bombarded as heretofore described by the appearance of the Beam On Pulse on conductor 9. With no charge on the bombarded spot, the number of primary electrons received from the cathode beam and the number of secondary electrons emitted from the spot and flowing to the collector 7 are approximately equal and no change in potential is then produced at the capacitatively coupled backing plate 6. The conductor 35 is coupled with the backing plate 6 as aforementioned and with the input of an amplifier 50. An amplifier output circuit 51 is normally maintained at a negative potential and, with no read-out signal sensed by the backing plate on reading a spot having no charge, remains at this potential for the read-out period previously described as occurring during the fourth microsecond of the operating cycle. The conductor 51 is coupled to one input terminal of an "and-inverter" circuit 52 and a conductor 53, to which the clock pulse Sample I is applied, is couple to the other input terminal. As the Sample I Pulse is positive and appears at 3.46 microseconds time there is no coincident polarity of inputs to circuit 52 and its inverted output is positive. The output terminal is coupled through lead 54 with an inverter 55 and the latter connected through a lead 56 to the anode of a diode 57. As the line 54 is positive on lack of coincident polarity of inputs to circuit 52 then the output of inverter circuit 55 is negative and will not effect the conductive state of the diode 57. In this situation, the beam is turned on at 3.0 microseconds time by the Beam On Pulse and terminated by the Dash Clamp Pulse at 6.0 microseconds time.

On the other hand, if a "one" or positive charge is stored on the elemental region being bombarded, when the beam is turned on the number of primary electrons received at the region is more than the number of secondary electrons emitted therefrom, since the target region tends to become stabilized at the collector potential, and a negative read-out voltage is, therefore, sensed at the backing plate 6 during the fourth microsecond of the operating cycle and is applied through lead 35 to the amplifier circuit 50. This negative read-out pulse is amplified and its polarity inverted by amplifier circuit 50 and appears as a positive pulse on lead 51. Both the Sample Pulse I and the output pulse on lead 51 are positive and coincident in time at 3.46 microseconds and as a result, the output of the "and-inverter" circuit 52 which is applied to conductor 54 is negative. This negative pulse is inverted by inverter circuit 55 and its output circuit 56 which is connected to the anode of the diode 57 is rendered positive. A condenser 58 is coupled to the cathode of diode 57 and is charged through the diode 57 at this time. The positive pulse from diode 57 is also applied through a lead 59 to one input terminal of "and-inverter" circuit 60. The other input terminal of this circuit is coupled with a conductor 61 upon which Sample Pulse II appears at 5.0 microseconds time during cyles in which information is not being stored in the tube. The positive pulse appearing on line 59 is timed to coincide with the positive Sample Pulse II so that the output of circuit 60 is negative and the cathode of a diode 61 connected thereto, swings negatively. The anode of diode 62 is connected to lead 11 and when its cathode is pulled negatively, the condenser C12 discharges through this path at 5.0 microseconds time to thereby cut off the cathode beam in the manner heretofore described but prior to termination of the backing plate pulse at 5.12 microseconds time. A positive charge is, therefore, regenerated in the elemental area representing a "one."

After the "one" has been regenerated, the negative Dash Clamp Pulse appears on conductor 40 at 6.0 microseconds time and pulls the cathode of diode 41 negative as aforementioned, however, condenser C12 has been discharged through diode 62 as described. The cathode of a diode 63, however, is also pulled negatively and condenser C58 is discharged through this path so as to prepare the regenerating circuit for the next read-out cycle.

The function of the circuit components may be summarized as follows: In the storing of either a binary "one" or "zero," the cathode beam is turned on at 3.0 microseconds time with the backing plate pulse applied a 4.0 microseconds time and terminated at 5.12 microseconds time. In writing or storing a "one," the One Write pulse discharges condenser C12 at 5.0 microseconds time and cuts off the cathode beam as well as terminates the output pulse before the backing plate pulse is terminated. In writing a "zero," the Dash Clamp Pulse discharges condenser C12 and turns the cathode beam off and terminates the output pulse after the backing plate pulse is terminated.

In regenerating a "one," the condenser C12 is discharged through the diode 62 and "and-inverter" 60 at 5.0 microseconds time as determined by the appearance of the Sample II Pulse. In regenerating a "zero," the condenser C12 is discharged at 6.0 microseconds time by the Dash Clamp Pulse as in writing a "zero."

The pulses appearing on output line 16 indicate by their duration if a "one" or a "zero" has been read out and regenerated. Line 16 is coupled to one input terminal of an "and-inverter" circuit 65 and a line 66 is coupled to the other input terminal. A positive clock pulse appearing on line 66 at 5.50 microseconds is in time coincidence only with the positive potential on line 16 when a zero is read out. Output line 67, therefore, is negative on read-out of a stored "zero" and positive on read-out of a stored "one."

It is to be noted that in reading out the "one" or positively charged region, the charge that exists prior to bombardment by the cathode beam is completely neutralized and that the regenerated charge is produced during the period that the backing plate pulse is applied. This action is advantageous in that repeated regeneration of a particular region will not result in a higher potential charge building up with unequal read-out signal magnitudes being present.

Figure 3:
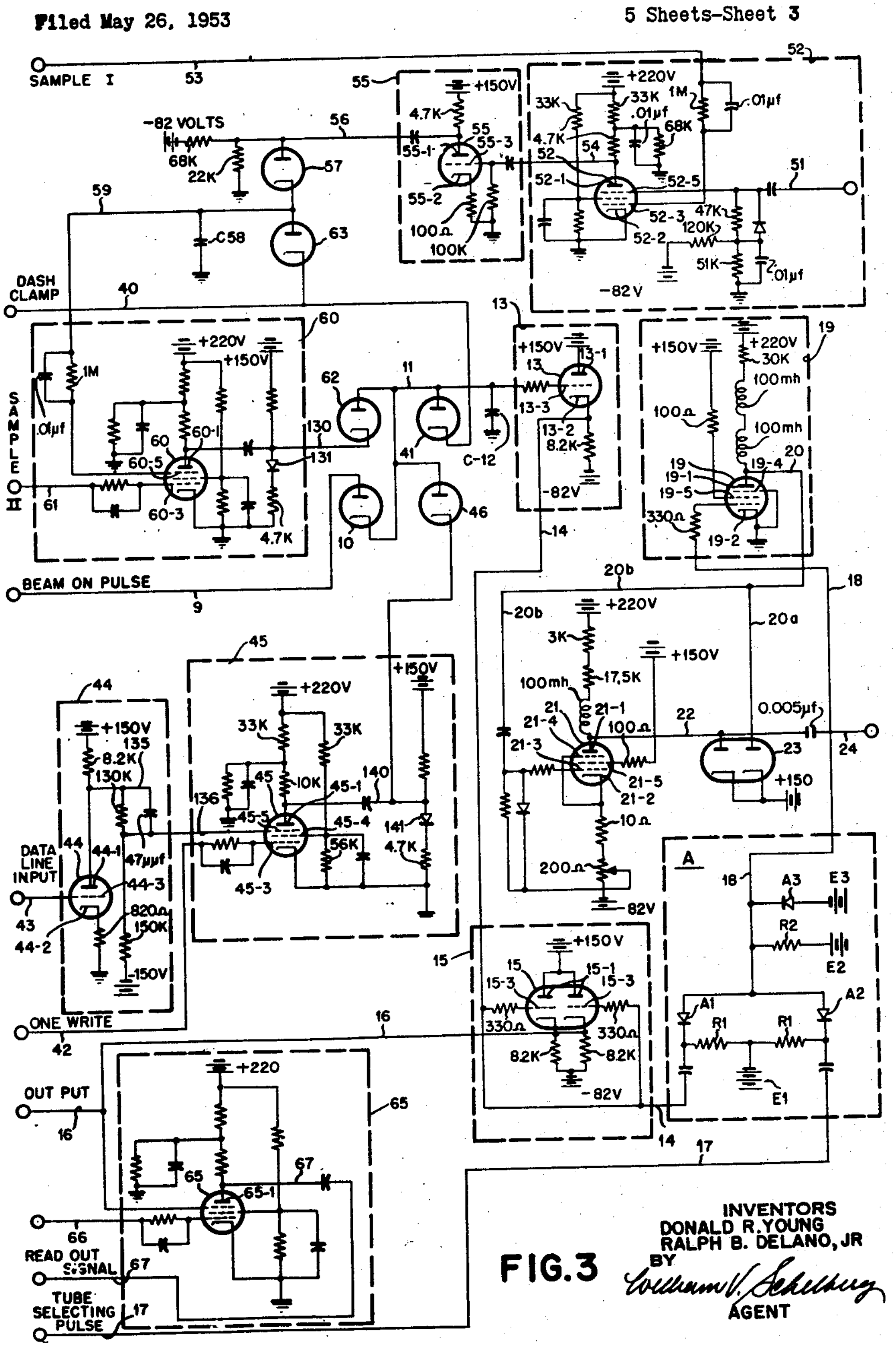
Figs. 3, 4 and 5 illustrate in detail the circuit components shown by block diagram in Fig. 2.
Figure 5:
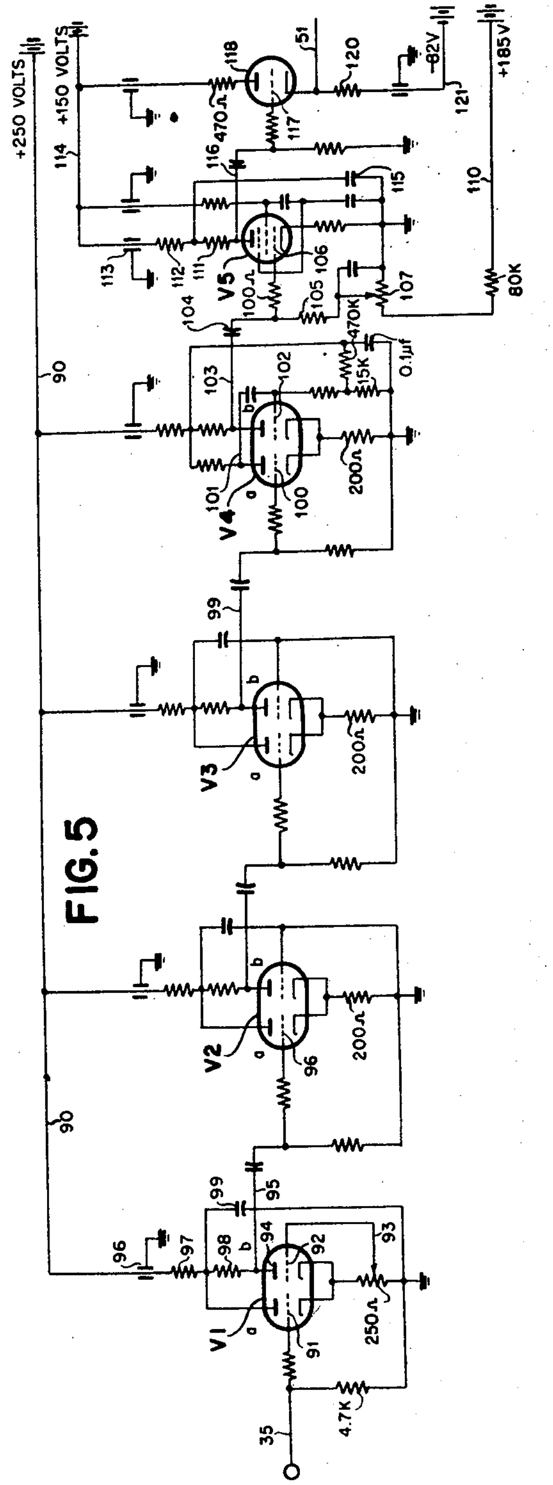

The circuit components shown in block form in Fig. 2 are illustrated in detail in Figs. 3–5 and will now be described to provide a more complete understanding of the circuitry employed in the resetting operation. Referring now to Fig. 3, the Beam On Pulse appearing on conductor 9 is applied through diode 10 and conductor 11 to the input of the cathode follower circuit 13. The latter comprises a tube also labeled 13 as shown in Fig. 5. Plate 13–1 of tube 13 is connected with a plate supply source of +150 volts and its cathode 13–2 connected through an 8.2K resistor to a potential source of −82 volts. Output lead 14 is connected to the cathode and is held at the cathode bias potential when the tube is not conductive, however, as the positive Beam On Pulse appears on grid 13–3, the tube 13 fires and the output lead 14 swings to a positive value. This positive output pulse appears on the conductor 14 and is applied to one input terminal of the diode coincidence circuit A and to the grids of the cathode follower circuit 15. Cathode follower 15 is similar to the cathode follower 13, however, two similar paralleled tube units are employed. The plates 15–1 are coupled to a +150 volt supply and the cathodes connected through individual 8.2K resistors to a −82 volt source. Each grid 15–3 is connected to line 14 through a separate 330 ohm resistor. The output circuit 16 is connected with each of the cathodes and is held at cathode potential when tube 15 is in a low conducting state. As the positive pulse appears on line 14, at 3.0 microseconds time, tube 15 is rendered conductive and output lead 16 swings positive as shown graphically in Fig. 1.

As previously mentioned, one terminal of the diode "and" circuit A also is connected with lead 14 and a positive selecting pulse is applied to conductor 17 connected to the other input terminal.

"And" circuit A comprises a pair of coupling diodes A1 and A2, respectively, connected in series with the input circuits 14 and 17 through coupling individual capacitors with a clamping diode A3 connected between the output circuit 18 and a voltage source E3. A pair of similar resistors R1 connect each of the input terminals to a voltage source E1 and a resistor R2 connects the output lead 18 to a voltage source E2. The supply voltages are adjusted so that E2 is greater than E3 and E3 is greater than E1 and the coupling and clamping diodes are conducting with no input signal applied. Upon coincident application of positive input signals, both of the diodes A1 and A2 are cut off and the output voltage on line 18 then rises so that a positive pulse is applied through a 330 ohm resistor to the control grid 19–3 of the inverter tube 19.

The cathode 19–2 and suppressor grid 19–4 are grounded and the screen grid 19–5 is connected through a 100 ohm resistor to a +150 volt source of potential. The plate 19–1 is connected through two series connected 100 millihenry coils and a 30K resistor to a +220 volt source of potential. These connecting elements are provided to give a desirable pulse rise time as is conventional practice.

Leads 20 and 20*a* connect the plate 19–1 and the right hand section of tube 23 to a +150 volt regulated source of potential so as to establish the plate potential applied to tube 19 at a maximum of +150 volts. As the positive pulse appears on lead 18, the tube 19 conducts and lead 20 is subjected to a lower potential for the period that the tube is conductive and this negative swing in voltage on line 20 is applied via lead 20*b* to the control grid 21–3 of the inverter tube 21. The plate 21–1 of this tube is connected to the +220 volt source through a 100 mh. coil and series connected 17.5K and 3K resistors and the screen grid 21–5 is connected through a 100 ohm resistor to the +150 volt source. The cathode 21–2 and suppressor grid 21–4 are commonly connected through a 10 ohm and series connected adjustable 200 ohm resistor to a source of −82 volts potential. As the pulse appearing on lead 20*b* is applied to the grid 21–3, tube 21 which is normally in a conductive state becomes cut off. Output lead 22 is coupled to the plate 21–1, and is subjected to an increase in potential for the interval that tube conductivity is decreased and this positive pulse is applied to the anode of the left half of the aforementioned double diode clipper 23. The output pulse applied to the control grid 4 of the memory tube appears on lead 24 which is coupled to the left anode of diode 23 and, therefore, may not rise above the +150 volts potential maintained on the cathode of the clipper 23 by the regulated +150 volt source.

Figure 4:
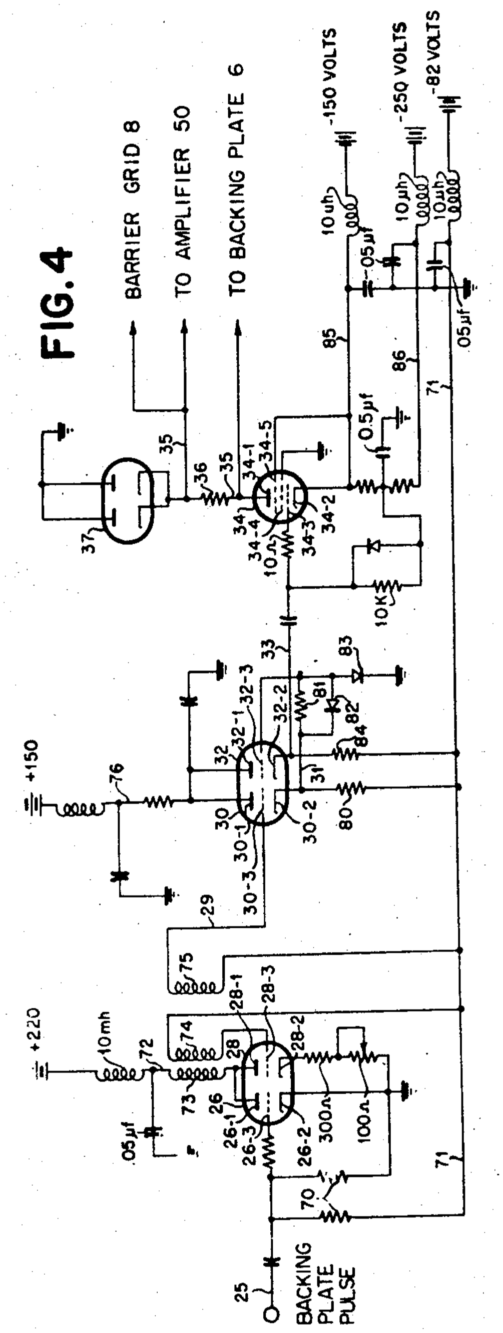

The backing plate modulating circuit comprising components 26, 28, 30, 32 and 34 are shown in detail in Figure 4 of the drawings. The Backing Plate clock pulse appears on terminal 25 as described, and is applied to grid 26–3 of pull over tube 26. The grid 26–3 is normally biased to cut off by connection to a resistor bridge 70 which is connected at one end to ground and at the other end to a conductor 71 which is maintained at approximately −82 volts. The plate 28–1 of blocking oscillator tube 28 and the plate 26–1 of pull over tube 26 are commonly coupled to a conductor 72 through a coil 73. Conductor 72 is connected to a +220 volt source through a filter circuit comprising a 10 mh. coil and .05 μf. condenser. The cathode 26–2 of the pull over tube is connected directly to ground and the cathode 28–2 of the oscillator tube is connected through a 300 ohm and 100 ohm adjustable resistor to ground. A coil 74 is inductively coupled with the coil 73 and is connected at one end to the conductor 71 and at the other end to the grid 28–3 of the oscillator tube. As the positive Backing Plate clock pulse appears on line 25 and is applied to the grid 26–3 this tube is rendered conductive and a current pulse flows through the coil 73. A voltage of opposite polarity is induced in coil 74 which drives the grid 28–3 of the oscillator tube positive and the latter then starts to conduct. Being commonly coupled through coil 73, this further increases the current in this coil until by this cumulative action, the grid 28–3 is driven in the positive region of tube saturation. When this condition takes place, the tube current begin to lessen and the grid potential becomes cumulatively more negative until the tube 28 completely cuts off. This blocking oscillator action results in a pulse of approximately one microsecond duration as determined by the constant of coils 73 and 74 and has a sharp rise and fall time with no overshoots. A coil 75 is inductively coupled with coil 73 and a voltage pulse is induced therein and applied through lead 29 to the grid 30–3 of the cathode follower tube 30. The plate 30–1 of this tube is connected to a line 76 and its cathode 30–2 connected to the −82 volt conductor 71 through a resistor 80. Line 76 is connected to a +150 volt source through a filter circuit comprising a 10 mh. coil and .05 μf. condenser. As the positive pulse induced in coil 75 is applied to the grid 30–3, tube 30 is rendered conductive and a positive output pulse appears on line 31 which is connected to the cathode of this tube. This positive pulse is applied to the grid 32–3 of a second cathode follower tube 32 through a clipping circuit comprising resistor 81 and a pair of diodes 82 and 83 with resistor 81 providing a fairly high input impedance to tube 32. The plate 32–1 is connected to the plate 30–1 and energized from the same potential source through line 76 and the cathode 32–2 is connected to line 71 through resistor 84. Output lead 33 is connected to cathode 32–2 and is normally negative, however, as the grid 32–3 is pulsed positively and tube 32 conducts, the cathode swings positively and a positive output pulse of approximately one microsecond duration appears on line 33 and is applied to the inverter circuit 34. The plate 34–1 of the inverter tube 34 is connected to lead 35 which is normally held at ground potential by the connection through a resistor 36 and diode 37. The cathode 34–2 and suppressor grid 34–5 are connected to a line 85 held at −150 volts while the screen grid 34–4 is grounded. The control grid 34–3 is biased negatively through a paralleled 10K resistor and diode coupled to a bleeder which is connected across the lines 85 and 86.

As the positive pulse is applied over conductor 33 and through a 10 ohm resistor to the grid 34–3, tube 34 is rendered conductive and the plate 34–1 and output lead 35 connected thereto, swings negatively. The output lead 35 is connected to the backing plate 6 with resistor 36 connected as shown between the backing plate and barrier grid 8.

In the actual operating model constructed, the inverter circuit comprises four pentodes identical to the one illustrated, connected in parallel. In like manner, diode 37 which is coupled to conductor 35 comprises four double diodes also connected in parallel in order to provide the capacity needed and to save space required for mounting a single tube of larger capacity.

Referring now to Fig. 3, it will be recalled that if a "one" is to be stored the Data Line conductor 43 is held at a negative value and a positive One Write pulse is applied to line 42 at 5.0 microseconds time. The Data Line conductor 43 is coupled with inverter circuit 44 which comprises a tube 44 having a plate 44–1 connected through an 82K resistor to a +150 volt source and a cathode 44–2 connected through an 820 ohm resistor to ground. A conductor 135 is connected to the plate 44–1 and is connected through a 100K resistor and 150K resistor to a −150 volt source. Output lead 136 is connected to the junction of these two resistors and is held at a low positive potential when tube 44 is in a non-conducting state. The Data Line input lead 43 is coupled with the grid 44–3 and the tube is held in a non-conducting condition when writing a "one" so that lead 136 is held at a positive potential supplied from the 100K and 150K resistor bridge and this potential is applied to the suppressor grid 45–5 of the "and-inverter" tube 45. The positive One Write pulse appearing on line 42 is applied to the control grid 45–3 and, when the polarities of both grids 45–3 and 45–5 are coincident and positive at 5.0 microseconds time, tube 45 conducts. The plate 45–1 of tube 45 is connected through a 10K and a 33K resistor to a +220 volt source and the screen grid 45–4 is connected to the junction of a resistor bridge comprising a 56K and 33K resistor which is connected between ground and the aforementioned +220 volt supply. An output lead 140 is connected to the plate 45–1 and is positive when the tube is in a non-conducting state. When the tube 45 fires at 5.0 microseconds time as in writing a "one," the output lead 140 is connected to ground through the tube and thus swings negatively lowering the potential of the cathode of diode 46 to which it is also connected. The condenser C12 then is discharged through a path including diode 46, a crystal diode 141 and 47K resistor to ground as shown.

If a zero is to be stored, the Data Line potential on conductor 43 is held at a positive value and inverter tube 44 conducts so that output line 136 is subjected to a negative potential swing as the plate 44–1 and lead 135 becomes less positive. With a negative output pulse on lead 136, there is no coincident polarity of inputs to "and-inverter" 45 at 5.0 microseconds time when the One Write pulse appears on conductor 42 and the inverter circuit 45 does not function to discharge condenser C12. In this case, however, the Dash Clamp Pulse, which appears on conductor 40 at 6.0 microseconds time, pulls the cathode of diode 41 negatively and condenser C12 is discharged through diode 41 at this time.

As previously mentioned, the amplifier circuit 50 is subjected to the large negative backing plate pulse from 4.0 to 5.12 microseconds time and, in reading out a stored positive charge, must faithfully reproduce a small negative pulse during the fourth microsecond interval of the cycle. It is for this reason that a six microsecond interval is provided in the cycle between the backing plate pulse and read-out amplification and this period allows the amplifier elements to recover from the backing plate pulse prior to reading the signal pulse. The amplifier circuit 50 is illustrated in detail in Fig. 5 and is designed for a high recovery rate. The novel features of the amplifier circuit include use of cathode coupled stages followed by a single pentode stage with a short time constant coupling circuit employed between the several cathode coupled stages and the pentode stage. A variable positive bias is utilized by the pentode stage to limit overshoots caused by the short time constant input and to give maximum gain at the moment the barrier grid tube is interrogated and a read-out signal obtained from the backing plate.

The diode bank 37 (Fig. 4) is provided to limit the magnitude of the backing plate pulse applied to the amplifier 50, however, if the barrier grid 8 is grounded rather than connected to lead 35, satisfactory operation may be obtained. In such a modification, the beam current has to swing the large barrier grid to backing plate capacity on read-out and as a result the output signal is of lesser magnitude compared with the arrangement shown in Fig. 2. Grounding the barrier grid has the advantage that electrons intercepted thereby do not appear in the output. The diode bank 37 also isolates the amplifier from ground during signal time. If no diodes were used and the amplifier connected directly to the backing plate, the amplifier input resistance would be limited by the value of resistor 36. The resistor 36 is normally a few hundred ohms so that the large barrier grid to backing plate capacitance may be charged and discharged in a fraction of the backing plate pulse time. If this resistor were to serve as the amplifier input resistance, more amplifier stages would be required.

Lead 35 is subjected to both the large backing plate pulse and the read-out signal pulse and, as shown at the left in Fig. 5, is coupled to the input of the amplifier 50 which is illustrated in detail in this figure. Four cathode coupled grounded grid stages V1 to V4 are provided with the plates of the tubes comprising these stages commonly connected to a lead 90 maintained at a potential of +250 volts. The cathodes of tubes V1a and V1b of the first stage V1 are connected through a 250 ohm resistor to ground and those of stages V2–V4 are connected through respective 200 ohm resistors to ground. The tubes comprising amplifier stages V1 to V4 are normally conductive through the above described paths. On application of a negative backing plate pulse or a negative read-out pulse to lead 35, grid 91 of the tube V1a is driven more negative and thereby reduces the conductivity of the tube and consequently the current flow through the aforementioned 250 ohm cathode resistor. As this occurs the cathode of tube V1b becomes more negative with respect to the grid 92 which is adjustably connected to the 250 ohm cathode resistor by lead 93. This has the same effect as a positive pulse applied to the grid 92 and the conductivity of tube V1b increases lowering the potential of its plate 94 for a period of time equal to the duration of the input pulse.

A feed through type capacitor 96 and resistor 97 are connected in series between the lead 90 and upper terminal of a plate resistor 98, which terminal is also connected to ground through a capacitor 99. The elements 96, 97 and 99 comprise a high frequency filter network which assures no spurious signals appear on the plate circuit to be transferred to an output signal lead 95 which is connected to the plate 94.

It is to be noted at this point that the conventional amplifier normally inverts a negative input signal so as to produce a large positive output. Thus, if the backing plate pulse were conventionally amplified, the positive output obtained would be sufficiently large to drive the grid of a following stage positive with respect to its cathode causing the grid to conduct current. This grid current would charge up the normally employed coupling capacitor and it would remain charged when the backing plate pulse decayed so that the grid would have a bias which would cut off the tube. Until the coupling capacitor discharges, the tube could not amplify any signal. The discharge time of such a coupling capacitor would be longer than the charge time as it charges through the grid to cathode impedance, which is very low when the grid is positive with respect to the cathode but otherwise very high. The use of cathode coupled grounded stages V1 to V4 avoid this problem as the input is not inverted and the backing plate pulse remains negative until the signal is of appreciable magnitude with respect to the backing plate pulse.

The negative output pulse appearing on lead 95 is applied to the grid 96 of the succeeding cathode coupled stage V2 and the output from stage V2 is applied to the succeeding stage V3, both of which function in an identical manner described in connection with the stage V1. The amplified negative output pulse sensed from the plate of tube V3*b* appears on lead 99 and is fed to the grid 100 of tube section *a* of stage V4. This negative pulse reduces the current flow in this stage in the same manner as described in connection with tube section *a* of stage V1. The cathode of V4*b* is then subjected to a negative pulse as in the preceding stages due to the decrease in current through the 200 ohm cathode resistor with the same resultant effect on the tube conductivity as if a positive pulse were applied to its grid. The plate of tube V4*a* becomes more positive as tube conductivity lessens and a positive pulse appears on lead 101 connected to this element and is applied to grid 102 of tube V4*b* which is positively biased through the bridges 15K and 470K resistors shown. The previously described negative pulse applied to the cathode of tube V4*b* and the positive pulse applied through lead 101 to its grid 102 are in phase and a regenerative boosting effect is produced. A negative output signal appears on lead 103 connected to the plate of tube V4*b* and is differentiated by a condenser 104 and resistor 105 which serve to shorten the apparent length of the amplified plate pule. This differentiated pulse is applied through a 100 ohm resistor to the control grid 106 of a pentode tube, V5. A positive bias is applied to the grid 106 through an adjustable resistor 107 connected at one end through an 80K resistor to a lead 110, maintained at a potential of approximately +185 volts. The other end of resistor 107 is connected to ground. The plate of the pentode tube V5 is connected through a plate resistor 111, a resistor 112 and a condenser 113 to a conductor 114 which is maintained at a potential of +150 volts. The elements 112 and 113 and a condenser 115 comprise a high frequency filter network similar to that described in connection with the V1 stage and which is also employed in each of the stages V2, V3 and V4.

The output signal is taken from the plate of the pentode and appears as a positive pulse on lead 116 since the negative pulse applied to the grid 106 reduces the conductivity of the pentode V5 and lessens the IR drop across the resistors 111 and 112 and the plate approaches more nearly the voltage of the 150 volt plate supply source. The output pulse on lead 116 is applied to grid 117 of a cathode followed tube 118. The plate of the tube 118 is connected through a 470 ohm resistor to lead 114 and its cathode connected through a resistor 120 to a conductor 121 which is maintained at a potential of −82 volts. As the positive pulse is applied to grid 117, the tube 118 conducts and the potential of its cathode increases so that a positive pulse appears on output lead 51, which is connected thereto and, as shown in Fig. 2, is coupled to the input of the "and-inverter" circuit 52.

The "and-inverter" circuit 52 is shown in detail in the upper right hand portion of Fig. 3 and consists of a pentode 52 having control grid 52–3 and suppressor grid 52–5. The plate 52–1 is connected through a 4.7K resistor and a 33K resistor to a +220 volt source and its cathode 52–2 is grounded as shown. A high frequency filter network is provided by the paralleled 0.1 μf. condenser and 68K resistor connected to the junction of the two aforementioned resistors and serves to prevent application of spurious signals to the plate circuit. The positive output pulses from amplifier 50 are applied via lead 51 to the grid 52–5 and the positive Sample I Pulse is applied over conductor 53 to the second grid 52–3. Coincident application of pulses of like polarities to both of these grids causes the tube 52 to conduct and the output lead 54 which is connected to the plate 52–1 of the tube is subjected to a reduction in potential for the duration of tube conductivity so that a negative output pulse is produced. As the backing plate pulse is applied to the memory tube from 4.0 microseconds time to 5.12 microseconds time while the Sample I Pulse appears at 3.46 microseconds time, there is no coincidence of inputs to the grids 52–3 and 52–5 and the pentode 52 does not conduct. The output lead 54, therefore, remains at the potential of plate 52–1 during this interval. The read-out signal pulse is obtained while the cathode beam is turned on from 3.0 to 4.0 microseconds time and after amplification appears at grid 52–5 coincident in time with the appearance of the Sample I Pulse on grid 52–3 and a negative output pulse is produced at the plate of tube 52.

The negative output pulse then appearing on line 54 is applied to the grid 55–3 of inverter tube 55. Plate 55–1 is connected to +150 volt source through a 4.7K resistor and cathode 55–2 is grounded through a 100 ohm resistor and the tube is normally in a conductive state with output lead 56, connected to plate 55–1, held at a low positive value. As the negative input pulse appears at grid 55–3, tube conductivity is reduced and the potential of the plate 55–1 and output lead 56 approaches the +150 volt potential of the plate supply source. This positive voltage swing is applied to the anode of diode 57 overcoming the negative bias from the bridged 68K and 22K resistors and, as described in connection with the Fig. 2 block diagram, is effective to charge condenser C58.

The positive pulse is also applied through lead 59 to the "and-inverter" 60 which operates in a manner similar to the previously described circuit 52 with the positive input pulse from line 59 applied to suppressor grid 60–5 and the Sample II positive clock pulse applied through lead 61 to control grid 60–3. The output lead 130 is connected to the plate 60–1 and, as the latter swings to a less positive value on conduction of the tube, a negative pulse is applied to the cathode of diode 62 to allow the condenser C12 to discharge through a path including the diode 62, conductor 130, a crystal diode 131 and a 4.7K resistor to ground.

As the condenser C12 is discharged, the output of cathode follower 13 becomes negative and the cathode beam is cut off and the cathode follower tube 15 is simultaneously extinguished to terminate the output pulse on line 16. Condenser C58, is then discharged by the Dash Clamp Pulse which is applied to lead 40 at 6.0 microseconds time and pulls the cathode of diode 63 negative providing a discharge path through this circuit and preparing condenser C58 for the next cycle of regenerative operation.

As shown graphically in Fig. 1, the output pulses appearing on conductor 16 indicate read-out of a "zero" or a "one" by the length of the output pulse. Output lead 16 is coupled to one input terminal of an "and-inverter" circuit 65 and a positive clock pulse is applied at 5.50 microseconds time on a lead 66 connected to the second input terminal. The "and-inverter" circuit 65 is substantially identical to the previously described circuit 45 and, to avoid repetition, will not be structurally described. It will be seen that coincidence of both the clock pulse on lead 66 and the output pulse on lead 16 occurs only when a "zero" is read out and that at this time both of the control grids are simultaneously positive so that lead 67, which is connected with the plate 65–1, swings negatively at 5.50 microseconds time. When a one is read out, line 16 is negative at 5.50 microseconds time and the positive pulse appearing on line 66 is ineffective to cause tube 65 to conduct so that the output lead 67 remains at a positive potential.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for storing binary information in an electrostatic memory tube having components including an electron gun, control grid, dielectric target and backing plate; comprising means for applying a short duration voltage pulse to said backing plate during each cycle of tube operation, means for turning on the cathode beam before said short duration voltage pulse is applied to said backing plate, means for selectively turning off the cathode beam before said short duration backing plate pulse is terminated, and further means for turning off the cathode beam after said short duration backing plate pulse is terminated in the event the cathode beam has not been selectively turned off, said cathode beam being on for some interval while said short duration backing plate pulse is applied.

2. Apparatus for storing binary information in an electrostatic memory tube having components including a cathode beam control grid, dielectric target and capacitatively coupled backing plate; comprising means for turning on the cathode beam, means for applying a negative potential pulse to the backing plate and terminating the negative potential pulse, means for turning off the cathode beam after said pulse is terminated in writing a "zero," and further means for terminating the negative potential backing plate pulse after the beam has been turned off in writing a "one," said cathode beam being on for some interval while said negative potential pulse is applied.

3. Apparatus for regenerating binary information stored as distinctive charge states on the dielectric target of an electrostatic memory tube having components including a dielectric target, a cathode beam control grid and a backing plate capacitatively coupled with said target; said apparatus comprising means for turning on the cathode beam so as to bombard a particular target region, means coupled to said backing plate for sensing the charge state on the bombarded target region, means for applying a short duration negative potential pulse to said backing plate, means for turning off said cathode beam before said short duration pulse is terminated on sensing a first charge state, and further means for turning off said cathode beam after said short duration negative pulse is terminated on sensing a second charge state, said cathode beam being on for some interval while said negative potential pulse is applied.

4. Apparatus for storing and regenerating stored binary information as distinctive charge states on the dielectric target of an electrostatic memory tube having components including a dielectric target, a cathode beam control grid and a backing plate capacitatively coupled with said dielectric target; said apparatus comprising means for turning on the cathode beam during each cycle of tube operation so as to impinge an elemental target region, means for applying a short duration voltage pulse to said backing plate during each cycle of tube operation, means coupled to said backing plate for sensing the charge state on the elemental region impinged by the cathode beam during that interval of the cycle while the beam is turned on and before the short duration backing plate pulse is applied, regenerate means for turning off said cathode beam before said backing plate pulse is terminated on sensing a first charge state, further regenerate means for turning off said cathode beam after said backing plate pulse is terminated on sensing a second charge state, write zero means for turning said cathode beam off after said backing plate pulse is terminated regardless of the sensing of a first charge state in storing a second charge state, and write one means for turning said cathode beam off before said backing plate pulse is terminated regardless of the sensing of a second charge state in storing a first charge state.

5. Apparatus for storing and regenerating stored information represented by distinctive charge states on the dielectric target of a cathode ray type storage tube having components including a dielectric target, a cathode beam control grid and a backing plate capacitatively coupled with said dielectric target; said apparatus comprising means for turning on the cathode beam during each cycle of tube operation to impinge an elemental target region, sensing means coupled to said backing plate for determining the charge state stored on the target region impinged by said beam, means for applying a short duration voltage pulse to said backing plate during each cycle of tube operation, regenerate means for turning off said beam before said short duration voltage pulse is terminated on determining the presence of a first charge state, further regenerate means for turning said beam off after said short duration voltage pulse is terminated on determining the presence of a second charge state, and write means for selectively turning off said cathode beam before said short duration pulse is terminated on storing a first charge state and after said short duration pulse is terminated on storing a second charge state while disabling control of said cathode beam by said sensing means.

6. An electrostatic storage system comprising in combination, a cathode ray type storage tube having components including an electron gun, beam deflection electrodes, control grid, collector grid, barrier grid, dielectric target and capacitatively coupled backing plate; means for establishing distinguishable charge states on an elemental region of said target including means for energizing said control grid and turning on the cathode beam at a uniform time during each cycle of tube operation, means for applying a pulse of short duration to said backing plate for a uniform interval during each cycle of tube operation, and means selectively operable to turn off the cathode beam before said pulse is terminated during each cycle of tube operation said cathode beam being on for some interval while said pulse of short duration is applied.

7. An electrostatic storage system comprising in combination, a cathode ray type storage tube having components including an electron gun, beam deflection electrodes, a control grid, a collector electrode, a barrier grid, a dielectric target and capacitatively coupled backing plate; means including said control grid for turning on said cathode beam and bombarding an elemental target region, sensing means coupled with said backing plate for sensing the charge state existing on said elemental region, means applying a short duration negative potential pulse to said backing plate, means for turning off said cathode beam before said short duration pulse is terminated on sensing a first charge state, and other means for turning off said cathode beam after said short duration pulse is terminated on sensing a second charge state said cathode beam being on for some interval while said short duration negative pulse is applied.

8. An electrostatic storage system comprising the apparatus as set forth in claim 7 including means for selectively controlling said cathode beam to turn off said beam before said short duration pulse is terminated without regard to the state of charge stored on said elemental region and sensed by said sensing means.

9. Apparatus as set forth in claim 7 in which said sensing means includes an amplifier circuit comprising a plurality of cathode coupled grounded grid amplifier stages and a single pentode output stage.

10. Apparatus as set forth in claim 7 in which said sensing means includes an amplifier circuit comprising in combination, a plurality of cathode coupled triode amplifier stages and a single pentode stage, said triode amplifier stages each comprising a pair of triodes, resistor means connecting the cathodes of each of said pair of triodes to ground, a source of plate potential, means connecting the plates of said triodes to said source, gain control means connecting said cathode resistor and the grid of one of said triodes of each cathode coupled stage, means providing positive grid bias for the output triode of the last cathode coupled stage, feed back means coupling the grid of said output triode and plate of the associated triode of the last cathode coupled stage, and means comprising a short time constant circuit coupling said last triode stage and said pentode stage.

11. An electrostatic storage system comprising in combination, a barrier grid storage tube having components including a beam control grid, dielectric target surface and capacitatively coupled backing plate, with binary information stored as distinctive charge states on said dielectric surface; means for modulating said control grid so as to turn on the cathode beam at a particular time during each cycle of storage tube operation and bombard a particular elemental target region, sensing means including an amplifier connected to said backing plate for sensing the state of charge existing on said elemental target region, means for modulating said backing plate for a short interval of time during each cycle of operation after said cathode beam has been turned on, means operable to turn off said cathode beam after termination of the backing plate modulation interval, first and second means operable to turn off said cathode beam before termination of the backing plate modulation interval, said first means being selectively operable and said second means being operable in response to said sensing means on sensing a particular charge state on said dielectric target.

12. An electrostatic storage system comprising a cathode ray type storage tube having components including an electron gun, beam deflection electrodes, a control grid, a barrier grid, a dielectric target and capacitatively coupled backing plate; means including said control grid for turning on said cathode beam and bombarding an elemental target region, sensing means coupled with said backing plate for sensing the charge state existing on said elemental region, said sensing means including an amplifier comprising a plurality of cathode coupled grounded grid amplifier stages, means for applying a voltage pulse to said backing plate, means for turning off said cathode beam before said voltage pulse is terminated on sensing a first charge state, and other means for turning off said cathode beam after said voltage pulse is terminated on sensing a second charge state.

13. An electrostatic storage system comprising apparatus as set forth in claim 12 including means for selectively controlling said cathode beam to turn off said beam before said short duration pulse is terminated without regard to the state of charge stored on said elemental region and sensed by said sensing means.

14. An electrostatic storage system comprising a cathode ray type storage tube having an evacuated envelope, electron gun means including a control grid mounted within said envelope for forming and focusing a beam of electrons along a path, a rectangular target mounted within said envelope and positioned to intercept said beam, said target having a surface providing secondary electron emission when impinged by said beam, a backing plate positioned in contact with said target on the side opposite to that upon which the beam impinges, a barrier grid comprising a fine mesh screen positioned in contact with the bombarded target surface, a collector electrode within said envelope for collecting said secondary electron emission and positioned between said electron gun means and said barrier grid, said collector electrode being formed of a plurality of strands of wire between which the beam passes, and means for applying potentials to said control grid and to said backing plate so as to establish distinguishable charge states on said target surface.

15. An electrostatic storage system comprising, in combination, a cathode ray type storage tube having components including an electron gun and beam control grid, beam deflection electrodes, a collector electrode, a barrier grid, a dielectric target and capacitatively coupled backing plate; means for applying a negative potential pulse to said backing plate for an interval of time; means including said control grid for turning on the cathode beam and bombarding an elemental target region for a period at least 1½ times as long as said interval of time; first control means for causing said beam to be turned off at least an instant before said backing plate pulse is terminated; and second control means for causing said beam to be turned off after said backing plate pulse has been terminated for a period at least half as long as said interval of time.

16. An electrostatic storage system comprising, in combination, a cathode ray type storage tube having components including an electron gun, beam deflection electrodes, a control grid, a collector electrode, a barrier grid, a dielectric target and capacitatively coupled backing plate; means including said control grid for turning on said cathode beam and bombarding an elemental target region, means applying a short duration voltage pulse to said backing plate; sensing means coupled with said backing plate for sensing the charge state existing on said elemental region; means for turning off said cathode beam before said short duration pulse is terminated on sensing a first charge state; other means for turning off said cathode beam after said short duration pulse is terminated on sensing a second charge state; and means connected to said backing plate and providing a high resistance path to ground during operation of said sensing means and a low resistance path to ground during application of said short duration pulse.

17. An electrostatic memory system comprising in combination, cathode ray type memory tube means including a dielectric target and capacitatively coupled backing plate, pulse generator means coupled to said backing plate and adapted to apply negative impulses thereto, sensing means coupled to said backing plate and adapted to detect a change in electrostatic charge developed on said dielectric target, said sensing means including an amplifier circuit having a plurality of cathode coupled triode amplifier stages and a single pentode amplifier stage, each of said cathode coupled stages comprising a pair of triode discharge devices, a common resistor means connecting the cathodes of each of said pairs of triodes to ground, a source of plate potential, means connecting the plate electrodes of each of said cathode coupled stages to said source, input terminals for each stage connected with the grid electrode of a first of each of said pair of triodes, output terminals for each stage connected with the plate electrode of a second of each of said pair of triodes, means connecting the grid of said second triode of each pair to s associated common cathode resistor, means connecting ıe output terminal of each stage and the input terminal f the succeeding stage, regenerative feed back means couling the plate of the first triode and grid of the second ·iode of the terminal stage of said plurality of triode tages and means providing a positive bias to the grid of aid second triode of said terminal stage, short time contant coupling means connecting said terminal triode stage nd said pentode stage and means for energizing said entode stage including variable positive control grid bias ıeans.

18. An electrostatic storage tube as set forth in claim 6 /herein said barrier grid comprises a ceramic frame member having a central opening, a first group of coplanar rid wires arranged in parallel relationship and extending cross the central opening of said ceramic frame member, a second group of coplanar grid wires arranged in arallel relationship across the central opening of said eramic frame member and positioned above and at right ngles with said first group of grid wires, said ceramic :ame member and said grid wires having substantially ıe same coefficient of expansion, and said dielectric target omprises a sheet supported between said grid wires and aid frame member and superimposed over said central pening.

19. In an electrostatic storage system as set forth in laim 16 wherein said collector grid, barrier grid, dielectric target and backing plate comprise a target assembly, said collector grid being formed of a single group of parallel grid wires supported on a first ceramic frame member, said barrier grid being formed of two groups of parallel grid wires arranged at 90° to one another and supported on a second ceramic frame member, said dielectric target formed of a sheet of dielectric material supported between said second frame member and said barrier grid wires, said backing plate being secured to said dielectric sheet on the side opposite to that in contact with said barrier grid wires, and means supporting said first and second frame members in fixed parallel spaced relationship.

References Cited in the file of this patent

UNITED STATES PATENTS

| | | |
|---|---|---|
| 2,370,399 | Goodale | Feb. 27, 1945 |
| 2,498,561 | Lipkin | Feb. 21, 1950 |
| 2,589,460 | Tuller | Mar. 18, 1952 |
| 2,617,963 | Arditi | Nov. 11, 1952 |
| 2,639,425 | Russell et al. | May 19, 1953 |
| 2,642,550 | Williams | June 16, 1953 |
| 2,675,499 | Sears | Apr. 13, 1954 |
| 2,706,264 | Anderson | Apr. 12, 1955 |
| 2,716,188 | Pensak | Aug. 23, 1955 |
| 2,726,328 | Clogston | Dec. 6, 1955 |